United States Patent [19]

Cabany et al.

[11] Patent Number: 4,618,757
[45] Date of Patent: Oct. 21, 1986

[54] METHOD AND APPARATUS FOR MANUFACTURING LARGE, METAL CYLINDRICAL STRUCTURES

[75] Inventors: Pierre Cabany, Riorges-Roanne; Andre Gardette, Le Coteau; Xavier Jacquet, Le Coteau; Aurelio Tollis, Le Coteau; Fernando Tollis, Le Coteau, all of France

[73] Assignee: Constructions Soudees du Coteau, Le Coteau, France

[21] Appl. No.: 647,799

[22] Filed: Sep. 6, 1984

[30] Foreign Application Priority Data

Sep. 6, 1983 [FR] France .................................. 83 14227

[51] Int. Cl.$^4$ .............................................. B23K 9/02
[52] U.S. Cl. .................................. 219/60 R; 219/59.1; 228/47; 228/184
[58] Field of Search ...................... 219/59.1, 60 R, 61, 219/61.3; 413/1, 69; 228/47, 184, 212

[56] References Cited

U.S. PATENT DOCUMENTS 4,494,291 1/1985 Morrison .............................. 228/184

FOREIGN PATENT DOCUMENTS

| 838202 | 2/1976 | Belgium . |
| 1937579 | 2/1971 | Fed. Rep. of Germany . |
| 2704845 | 8/1977 | Fed. Rep. of Germany . |
| 2489799 | 3/1982 | France . |
| 7601404 | 8/1977 | Netherlands . |
| 2068799 | 8/1981 | United Kingdom . |

Primary Examiner—E. A. Goldberg
Assistant Examiner—C. M. Sigda
Attorney, Agent, or Firm—Cushman, Darby & Cushman

[57] ABSTRACT

Method for manufacturing a large-sized, cylindrical, metal casing by welding successive cylindrical sections, characterized in that metal in the form of a strip is unwound continuously and at a uniform speed from a coil (6) and in that, as the strip (16) is fed through, crushing (15) or breaking of the fibre, pulling (13), polishing (17) and measuring of the length are continuously performed, in that at the same time the strip (30) thus unwound is continuously arranged on turntable (2) comprising a rotating table (26) the speed of rotation of which corresponds to the feeding speed of the strip at the radius of the cylindrical section being made, and then in that, when the length corresponding to the spread-out form of the cylindrical section has been obtained, unwinding of the strip is stopped, the cylindrical section (30) is cut off from the remainder of the strip (16) and is wound onto the turntable, in that the structure being assembled is then brought into position above this cylindrical section (30) and in that the top edge of this cylindrical section is aligned and welded horizontally with the bottom edge of the remainder of the structure by rotating the turntable continuously and passing the said edges between fixed rollers (33) and in front of a fixed welding head (39), and finally in that the vertical weld for closing each cylindrical section is performed by stopping the turntable and displacing the welding head (39) vertically.

7 Claims, 1 Drawing Figure

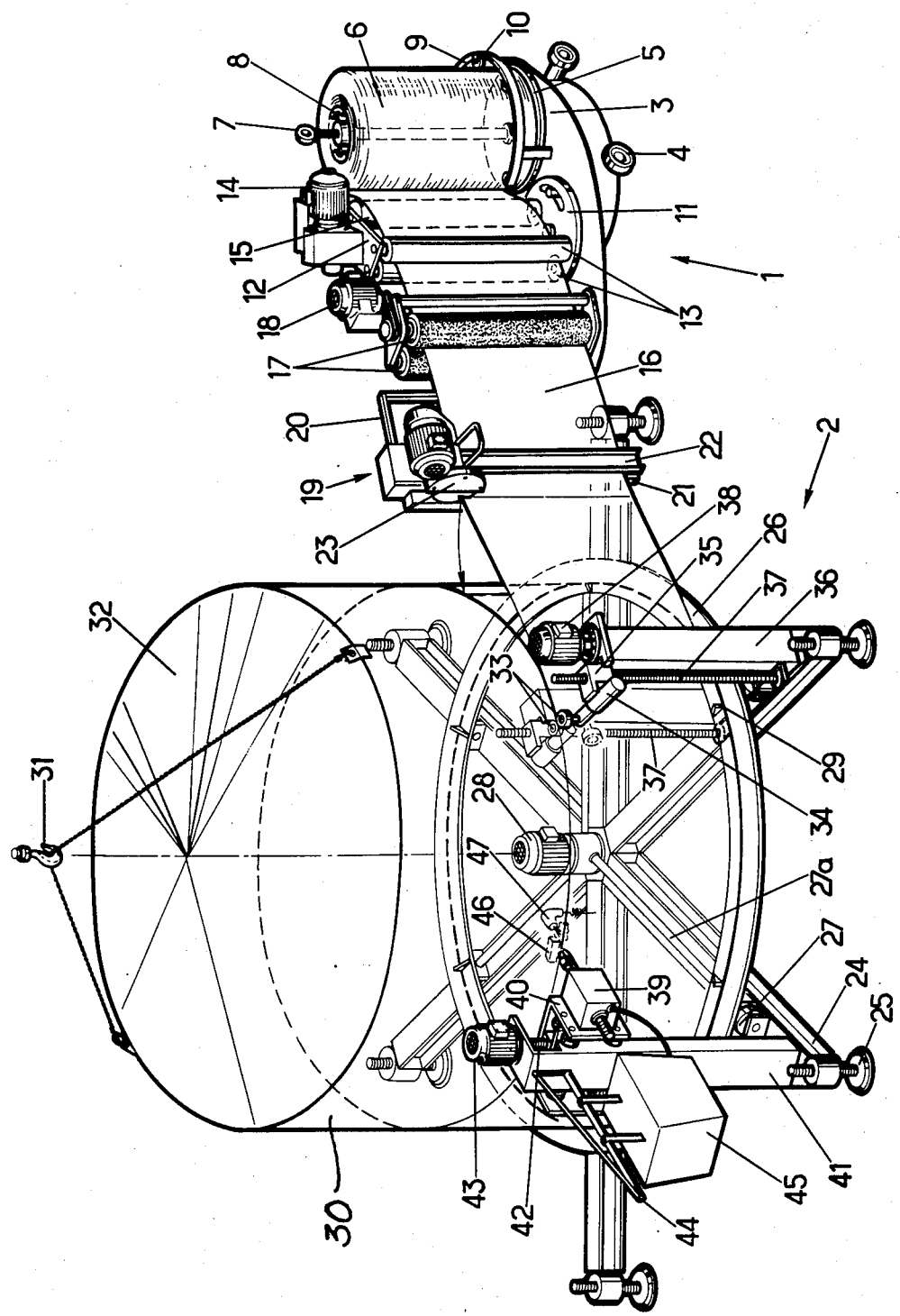

METHOD AND APPARATUS FOR MANUFACTURING LARGE, METAL CYLINDRICAL STRUCTURES

The invention relates to the manufacture of large, metal, cylindrical structures such as are used in the chemical, pharmaceutical or food industry, the size of which makes transport difficult or impossible.

These structures are essentially containers consisting of a top piece, a bottom piece and a cylindrical section, and their diameter and height often exceed 8 to 10 meters, that is to say values far greater than the normal width of a road, for this reason, these structures are manufactured in the form of separate elements which are assembled on site by means of welding.

Usually, the elements which make up the container are assembled as follows: the top pieces and bottom pieces are manufactured beforehand in the factory in the form of transportable elements and are welded on site. The cylindrical part consists either of metal sheets cut to size, pre-bent and welded together in the vertical direction and in the horizontal direction so as to obtain the cylindrical section of the required size, or of strips of sheet metal which have been prepared in the factory and wound up and which correspond to the cylindrical section.

These methods of manufacturing cylindrical sections have several drawbacks. In particular, welding the individual sheets and aligning the sheets with each other results in a lengthy assembly time and a large number of welding operations on site. Some of the welding operations on site can be eliminated by welding long strips, but this leads to handling and assembly difficulties which impair the overall shape of the assembled structure. In fact, the fairly difficult handling of the various wound-up cylindrical sections gives rise to knocks and defects, and the unwinding of these cylindrical sections generally causes the metal to yield in a varying manner, thus leading to cylindrical sections with irregularly polygonal shapes, which not only have an unfavourable appearance, but also make alignment and welding of the superimposed cylindrical sections extremely difficult.

The object of the invention is to eliminate the abovementioned drawbacks by eliminating most of the handling operations, improving the configuration of the elements and reducing considerably the labour force used.

The method according to the invention consists in using directly a metal strip in the form of a coil, such as is supplied by steel works, ensuring its continuous unwinding, the crushing or breaking of its fibre, its feeding and, if necessary, its polishing, its cutting to an exact length corresponding to the spread-out form of a cylindrical section, and then its continuous winding onto a revolving turntable until the cylindrical section is closed and manually tack-welded, after which a previously assembled cylindrical section is positioned above the turntable by a handling means, and the sheets are aligned by means of a pair of aligning rollers mounted on the turntable at a point on its periphery, one being on the inside and the other on the outside of the joint between the two cylindrical sections, and a welding head, located at another point on the periphery, is used to perform the horizontal welds by rotating the turntable, the two aligning rollers as well as the welding head being movable vertically so that the vertical welds can also be performed, the turntable then being at a standstill, and it also being possible to use the aligning rollers for smoothing off the horizontal and vertical welds by flattening.

The invention also relates to an apparatus for implementing the abovementioned method.

Other features of the invention will become apparent from the following description of an embodiment taken as an example and illustrated in the single FIGURE which shows a perspective view of the apparatus.

The apparatus comprises a certain number of devices which are preferably grouped into two units, one of which is a feed unit 1 and the other a turntable 2.

The feed unit 1 has a support 3 which is preferably movable on castors 4 facilitating its positioning and which carries a rotating disc 5 which receives the coil 6 of metal in strip form, this metal almost always consisting of frozen-rolled stainless steel. This disc 5 which carries the coil has a lifting rod 7 and an expanding chuck 8 located in the middle of the coil 6, and an external coil guide 9 fixed on the support 3 around the coil 6 and provided with guiding rollers 10, the assembly making it possible to mount the coil 6 on the disc 5 so that it can be unwound about a vertical spindle and to keep the coil compact without premature unwinding, both on the inside and on the outside.

The support 3 of the unit 1 also has a circular base 11 which can be adjusted by pivoting about a vertical spindle and which carries a movable rack 12 with two rollers 13 for feeding the metal sheet, these rollers being driven by a gear motor 14 mounted on the support 12. Furthermore, this support has a crushing roller 15 which is idle and is used to break the fibre of the metal sheet 16 drawn by the feed rollers 13. The assembly consisting of the support 12, the feed rollers 13 and the crushing rollers 15 can be oriented in the suitable direction by rotating the circular base 11 and fixed in the required position by any suitable means.

The support 3 also has a pair of polishing rollers 17 which are driven by a variable-speed motor 18 and which can be brought together so as to press against and polish the two surfaces of the sheet 16 as it is unwound.

The sheet 16 which has thus been unwound, crushed, fed and polished passes, after leaving the feed unit 1, into a cutting device 19 which has a support frame 20 which is adjustable about a vertical spindle with respect to the base support 3 of the feed unit, this support frame 20 itself having two cutting guides 21 and 22 which have a pneumatic clamping action and are located on either side of the sheet 16, the external guide 22 having two guiding rails on which a cutting head 23 can be displaced vertically, which cutting head can be, for example, an abrasive disc rotating at high speed or a thermal cutting torch or any other cutting device, depending on the nature of the metal to be cut. The cutting head 23 is displaced vertically to cut the sheet 16 to form vertical edges on the sheet 16.

The turntable 2 consists of a star-shaped frame 24 mounted on adjusting jacks 25 by means of which the said turntable can be positioned horizontally and level with the support 3. A rotating ring 26 is arranged on this frame, which ring rotates on support rollers 27 which swivel on each of the arms of the star 24 and at least some of which are made to rotate by a variable-speed gear motor 28 located, for example, at the centre of the star with radial transmission shafts 27a. The rotating table in the form of a ring 26 has a certain number of internal wedges 29 which can be adjusted radially so as to be positioned at the exact radius corresponding to the internal radius of the cylindrical section being assembled.

The variable-speed gear motor 28 is adjusted so that the peripheral speed at the radius defined by the wedges 29 corresponds exactly to the speed at which the strip 16 is fed by the feed rollers 13.

The end of the strip leaving the feed unit 1 thus passes onto the top of the table 26 and is automatically wound into the shape of a cylindrical section on this table as the latter rotates.

Using a suitable measuring device, not shown, it is possible to measure exactly the length of sheet metal 16 unwound since the last cutting operation, and when this length corresponds exactly to the spread-out form of the cylindrical section being assembled, the feed rollers 13 are stopped and the cutting device 19 actuated so as to separate from the strip 16 the part 30 intended to form the cylindrical section. The two edges of the latter are then aligned with each other and provisionally assembled by means of welding spots performed manually for example.

Above the turntable, provision is made for a handling means consisting, for example, of a simple crane, only the hook 31 of which has been shown in the figure and which is used to raise the assembly consisting of the top piece 32 and cylindrical sections such as 30 which have been previously made, and then to bring it into position so that its bottom edge rests on the top edge of the cylindrical section which has just been made on the turntable, thereby achieving vertical alignment. As regards alignment in the horizontal direction, this is facilitated by the identical diameters of the various cylindrical sections made in the same way, and, in particular, by the geometric uniformity of their edges due to the continuity of the unwinding operation and breaking of the fibre by the crushing roller 15. Furthermore, alignment is ensured by a pair of rollers 33 each mounted on a clamping jack 34 which itself is mounted on a carriage 35 which is movable on a vertical column 36 rigidly fixed to its base on the frame 24, vertical displacement of the carriage 35 being ensured by a screw 37 driven by a variable-speed unit 38. The two screws 37, one of which is located on the outside and the other on the inside of the ring 26, are preferably driven by each other by means of a single drive unit 38.

Naturally, the assembly is arranged so that the aligning rollers 33 are positioned on either side of the joint between two successive cylindrical sections.

By rotating the turntable it is possible to bring the two aligned edges of the cylindrical section in front of the welding head 39 of a suitable type, TIG, MIG or MAG, which is mounted on a carriage 40 movable vertically on another vertical column 41 fixed to its base on the frame 24. Displacement of the carriage is also ensured by a screw 42 driven by a variable-speed motor 43. A bracket 44 is used to support the control box and a container 45 for supplying filler metal.

The posts 36 and 41 can, if necessary, be combined to form a single post, with the screws 37 and 42 on each side, for example.

The carriage 40 is also maneuvered by its motor so as to be brought into the welding position corresponding to the joint between the two successive cylindrical sections. Provision can also be made inside the cylindrical section for an injector 46 of inert gas in order to protect the rearside of the weld or for a hot-air jet 47 in order to heat and dry these sheets during welding on site.

After welding has been completed, if necessary in several passes, the weld seam is flattened between the rollers 33 by making the turntable perform an additional rotation while applying a strong pressure to the jacks 34. This is particularly important in the food industry where the risk of bacteria spreading requires that the internal surfaces be smooth and continuous so as to ensure rigorous hygienic conditions.

The vertical weld for closing the cylindrical section, which was merely tack-welded until then, can be performed in the same way, the turntable being stopped at a suitable position and the welding head 39 being driven by its motor 43 at the desired speed. In the same way, the vertical weld thus performed can be smoothed off by tilting the rollers 33 so as to make their spindles horizontal, as shown by the broken line in the figure, the weld obviously being brought into a suitable position by rotating the turntable and then being flattened by vertically maneuvering the rollers 33 by means of the variable-speed motor 38.

Obviously, according to the complete method, the first operation consists in assembling the top piece 32 and forming the first cylindrical section and in performing the horizontal weld between the top piece and the first cylindrical section in the same way as has just been described. Then, the various cylindrical sections are formed and assembled in succession, each new cylindrical section being placed underneath the structure, and the last cylindrical section is completed, the bottom piece obviously being welded subsequently using another method.

Finally, therefore, it can be seen that the method according to the invention requires only a very few handling and manual operations and produces structures with a perfect configuration and a faultless surface, with smoothed welds, while the apparatus involves bringing onto the site only the two units 1 and 2 and the metal coils.

We claim:

1. An apparatus for manufacturing a large-sized cylindrical metal casing by forming and welding successive cylindrical sections, said apparatus comprising:
    a coil unwinding device with a vertical spindle and a support disc for unwinding a metal strip from a coil of said strip;
    a device for forming and treating said metal strip;
    a device for severing a sheet from said strip by cutting said strip to form vertical edges;
    a turntable comprising a base and a rotating table made of a ring mounted on rollers, at least one of said rollers being driven at an adjustable speed to form each new cylindrical section from said sheet;
    raising means for raising a casing being assembled above a subsequent section to be formed;
    welding means for welding together the vertical edges of a raised cylindrical section and a subsequent section located under the raised casing;
    a pair of rigid vertical columns integrally fixed to said base of the said turntable and each supporting a roller carriage displaceable vertically by means of a screw, said carriage carrying a jack capable of pressing a roller against the cylindrical section, the two columns and carriages supported thereby being arranged one on the outside and the other on the inside with respect to the rotating table, a variable-speed gear motor being arranged to drive both said screws at the same speed; and a third column integrally fixed to said base of said turntable and carrying a welding carriage movable vertically under the action of a screw driven by a variable-speed gear motor, said welding carriage carrying a welding head with auxiliary supply elements therefor.

2. Apparatus according to claim 1, characterised in that the coil unwinding device has internal (8) and external (9) retaining devices which prevent any premature unwinding.

3. Apparatus according to claim 2, characterised in that the device for forming and treating sheet metal comprises:
an idle crushing roller (15) followed by a pair of feed rollers (13) driven by a gear motor (14), all of these rollers being mounted on a support (11,12) whose direction can be adjusted; and
a pair of polishing rollers (17), followed by a device (19) for clamping the strip, this latter device being adjustable by means of articulation on a support (3).

4. Apparatus according to claim 2, characterised in that the table has a certain number of wedges (29) which can be adjusted radially so that their external edges are positioned at a distance from the center corresponding to the radius of the cylindrical section.

5. Apparatus according to claim 1, characterised in that the force of the jacks (34) for clamping the rollers (33) and the bending strength of the two corresponding columns (36) are determined so as to be able to exert sufficient pressure between the rollers (33) so that the weld seams are flattened, the supports for the rollers (33) comprising in addition a tilting device by means of which the spindles of the rollers can be positioned so as to be vertical and horizontal, as required.

6. Apparatus according to claim 5, characterised in that comprising, moreover, close to the welding point and on the inside of the cylindrical section, a suitable support with an inert-gas injector (46).

7. Apparatus according to claim 5 comprising, close to the welding point and on the inside of the cylindrical section, a suitable support with a torch for drying the sheets.

* * * * *